US011108215B2

(12) United States Patent
Culhane et al.

(10) Patent No.: US 11,108,215 B2
(45) Date of Patent: *Aug. 31, 2021

(54) MODULAR GAS INSULATED SWITCHGEAR SYSTEMS AND RELATED CABLING MODULES

(71) Applicant: Eaton Intelligent Power Limited, Dublin (IE)

(72) Inventors: Michael Patrick Culhane, Delafield, WI (US); Marten Binnendijk, Hengelo (NL); David Allan Aho, Waukesha, WI (US); Brent David Henry, Arden, NC (US); David Glenn Woolard, Mauldin, SC (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 16/260,258

(22) Filed: Jan. 29, 2019

(65) Prior Publication Data

US 2019/0237949 A1 Aug. 1, 2019

Related U.S. Application Data

(63) Continuation-in-part of application No. 15/917,986, filed on Mar. 12, 2018.

(Continued)

(51) Int. Cl.
*H02B 1/21* (2006.01)
*H02B 13/035* (2006.01)
(Continued)

(52) U.S. Cl.
CPC .............. *H02B 1/21* (2013.01); *H02B 1/48* (2013.01); *H02B 11/02* (2013.01); *H02B 13/005* (2013.01);
(Continued)

(58) Field of Classification Search
None
See application file for complete search history.

(56) References Cited

U.S. PATENT DOCUMENTS 7,307,227 B2 12/2007 Buettner
2005/0219804 A1* 10/2005 Arioka ................. H02B 13/035
361/612

(Continued)

FOREIGN PATENT DOCUMENTS

DE 41 25 786 A1 2/1993
DE 10 2014 104 541 A1 10/2015
(Continued)

OTHER PUBLICATIONS

Notification of Transmittal of the International Search Report and the Written Opinion of the International Searching Authority, dated Mar. 25, 2019, 16 pages.

(Continued)

*Primary Examiner* — Courtney L Smith
(74) *Attorney, Agent, or Firm* — Stanek Lemon Crouse & Meeks, PA (57) ABSTRACT

A gas insulated switchgear (GIS) system is provided including at least two separate modules including components of GIS, the at least two separate modules being independent of one another and configured to be assembled into the GIS system at a destination, wherein one or more of the at least two separate modules includes one of cabling and a solid insulated bus bar to connect the GIS system to an electrical power system at the destination. Related cabling modules are also provided.

20 Claims, 5 Drawing Sheets

Related U.S. Application Data (60) Provisional application No. 62/623,716, filed on Jan. 30, 2018.

(51) Int. Cl.
  *H02B 11/02* (2006.01)
  *H02B 1/48* (2006.01)
  *H02B 13/00* (2006.01)

(52) U.S. Cl.
  CPC ....... *H02B 13/035* (2013.01); *H02B 13/0358* (2013.01)

(56) References Cited

U.S. PATENT DOCUMENTS

| | | | |
|---|---|---|---|
| 2009/0316339 A1* | 12/2009 | Jung | H02B 13/0358 361/612 |
| 2010/0128417 A1* | 5/2010 | Ichinomiya | H01H 1/5844 361/636 |
| 2010/0178797 A1 | 7/2010 | Byrne | |
| 2011/0299226 A1 | 12/2011 | Milovac et al. | |
| 2011/0299228 A1* | 12/2011 | Milovac | H02B 13/02 361/614 |
| 2012/0087051 A1 | 4/2012 | Spitaels et al. | |
| 2013/0050905 A1* | 2/2013 | Kim | H02B 13/045 361/608 |
| 2013/0170104 A1* | 7/2013 | Kim | H02B 11/12 361/618 |
| 2015/0030889 A1 | 1/2015 | Kawaguchi et al. | |
| 2015/0357774 A1* | 12/2015 | Ren | H01R 25/162 439/110 |
| 2016/0172826 A1 | 6/2016 | Ren | |
| 2016/0198592 A1 | 7/2016 | Schmitt et al. | |
| 2018/0070475 A1 | 3/2018 | Ross | |
| 2018/0083426 A1* | 3/2018 | Ali | H02B 1/36 |
| 2018/0090913 A1* | 3/2018 | Johnson | H01H 33/66 |
| 2018/0366923 A1* | 12/2018 | Yanniello | H02B 13/035 |
| 2018/0366924 A1 | 12/2018 | Yanniello | |
| 2019/0280466 A1* | 9/2019 | Benson | H02B 13/0358 |

FOREIGN PATENT DOCUMENTS

| | | |
|---|---|---|
| EP | 1 107 408 A1 | 6/2001 |
| JP | H07123541 A | 5/1995 |
| KR | 10-2013-0000620 A | 1/2013 |

OTHER PUBLICATIONS

"ZX-Family Gas-insulated medium voltage switchgear," ABB AG, www.abb.com/medium voltage, 2009, 6 pages.

\* cited by examiner

MODULAR GAS INSULATED SWITCHGEAR SYSTEMS AND RELATED CABLING MODULES

CLAIM OF PRIORITY

The present application claims priority to U.S. Provisional Application Ser. No. 62/623,716, filed Jan. 30, 2018, entitled Gas Insulated Switchgear Modules and is a continuation-in-part of U.S. patent application Ser. No. 15/917,986, filed Mar. 12, 2018, entitled Interchangeable Switchgear Modules and Related Systems, the contents of which are hereby incorporated herein by reference as if set forth in its entirety.

FIELD

The inventive concept relates generally to power distribution assemblies and, more particularly, to gas insulated switchgear (GIS).

BACKGROUND

In an electric power system, switchgear is the combination of, for example, electrical disconnect switches, fuses or circuit breakers used to control, protect and isolate electrical equipment. Switchgear can be used both to de-energize equipment to allow work to be done and to clear faults downstream. There are different types of switchgear.

In particular, switchgear may be a simple open-air isolator switch or it may be insulated by some other substance. An effective, although more costly, form of switchgear is the gas-insulated switchgear (GIS), where the conductors and contacts are insulated by pressurized gas, for example, sulfur hexafluoride gas ($SF_6$). The combination of equipment within the switchgear enclosure allows them to interrupt fault currents of thousands of amps.

Gas-insulated switchgear (GIS) generally handles very high voltages, for example, from 5 kV to 1200 kV. Gas-insulated high-voltage switchgear (GIS) is a compact metal enclosed switchgear consisting of high-voltage components such as circuit-breakers and disconnectors, which can be safely operated in tight spaces.

SUMMARY

Some embodiments of the present inventive concept provide a gas insulated switchgear (GIS) system including at least two separate modules including components of GIS, the at least two separate modules being independent of one another and configured to be assembled into the GIS system at a destination. One or more of the at least two separate modules includes one of cabling and a solid insulating bus bar to connect the GIS system to an electrical power system at the destination.

In further embodiments, the one or more of the at least two separate modules may be shipped prior to shipment of remaining modules of the at least two separate modules such that power connections from the electrical power system are connected at the destination in advance of connecting the remaining modules.

In still further embodiments, any one of the at least two separate modules may be configured to be replaced in the GIS system without replacement of remaining ones of the at least two separate modules.

In some embodiments, the at least two separate modules may include a low-voltage unit, a main bus unit, a mechanism unit, a circuit breaker unit, a disconnect unit, a current transformer unit, a voltage transformer unit and/or a cabling unit.

In further embodiments, each of the low-voltage unit, the main bus unit, the mechanism unit, the circuit breaker unit, the disconnect unit, the current transformer unit, the voltage transformer unit and/or the cabling unit may each be a dedicated separate module in the GIS system.

In still further embodiments, the at least two separate modules may include a low-voltage compartment, a control unit, a three-position disconnector operating mechanism, an insulating gas in a gas tank, a circuit breaker, a circuit breaker operating mechanism, voltage transformers (VTs), bus bar connectors, current transformers (CTs), a bus connector, a three-position disconnector operating mechanism and a cable connector.

In some embodiments, the at least two modules may be connected and disconnected without removing gas from the system.

In further embodiments, the at least two modules may be connected using bolt-less connecting cones with alignment features such that the at least two modules are connected and disconnected without cables.

In still further embodiments, the at least two modules may be connected and disconnected without rear access.

In some embodiments, the at least two modules may be connected and disconnected without removing an entire front panel.

Further embodiments of the present inventive concept provide a cabling module for use in a modular gas insulated switchgear (GIS) system, the cabling module including one of cabling and a solid insulated bus bar to connect the GIS system to an electrical power system at a destination. The modular GIS system includes at least two separate modules including components of GIS, the at least two separate modules being independent of one another and configured to be assembled into the GIS system at the destination, wherein one or more of the at least two separate modules includes the cabling module.

DETAILED DESCRIPTION

Specific exemplary embodiments of the inventive concept now will be described with reference to the accompanying drawings. This inventive concept may, however, be embodied in many different forms and should not be construed as limited to the embodiments set forth herein; rather, these embodiments are provided so that this disclosure will be thorough and complete, and will fully convey the scope of the inventive concept to those skilled in the art. In the drawings, like numbers refer to like elements. It will be understood that when an element is referred to as being "connected" or "coupled" to another element, it can be directly connected or coupled to the other element or intervening elements may be present. As used herein the term "and/or" includes any and all combinations of one or more of the associated listed items.

The terminology used herein is for the purpose of describing particular embodiments only and is not intended to be limiting of the inventive concept. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

As discussed above, gas-insulated switchgear GIS generally handles very high voltages, for example, from 72.5 kV to 1200 kV. Gas-insulated high-voltage switchgear (GIS) is a compact metal enclosed switchgear consisting of high-voltage components such as circuit-breakers and disconnectors, which can be safely operated in tight spaces. When customers order switchgear, they generally have tight schedules for completion and delays can cost significant additional expense and/or opportunity cost. Conventional GIS systems can take more than twice the amount of time to install compared to air insulated switchgear (AIS). This extra time is partially due to special cabling requirements and the limited space available. Accordingly, some embodiments of the present inventive concept provide modular GIS systems that can be shipped separately. In other words, components that are more easily manufactured may be shipped first and be set up while the other components are still being manufactured. The more complicated modules may then be plugged in to the prior shipped modules allowing customers to meet the set timeline.

As will be discussed further below with respect to the FIGS. 1A through 5, manufacture of the modules of the present inventive concept may be similar to traditional manufacture, but may be split into two or more modules that could be shipped to the customer site early to allow for cabling connections to be made early in the manufacturing process while the remaining modules of the GIS system is being manufactured. This will also allow for the first module of multiple sections to be connected to another with a bus or cables prior to arrival of the later modules. A second module may include gas tank(s) containing the breaker and/or disconnector and/or main bus. In some embodiments, these modules could be replaced without exchanging the entire system which is generally required in conventional GIS systems. Other modules may include, for example, a low-voltage module, a main bus module, a mechanism module, current transformer (CT)/voltage transformer (VT) modules and the like. Furthermore, in some embodiments of the present inventive concept, the modules may be removed/installed without removing gas from the tank(s) and may connect and disconnect from one another more easily, e.g., connect using bolt-less connection cones having alignment features and not requiring wiring.

It will be understood that embodiments of the present inventive concept will be discussed herein with respect to a specific number and type of modules, however, embodiments of the present inventive concept are not limited to this configuration. Modules discussed herein may be combined or separated into multiple modules without departing from the scope of the present inventive concept.

Figure 1A:
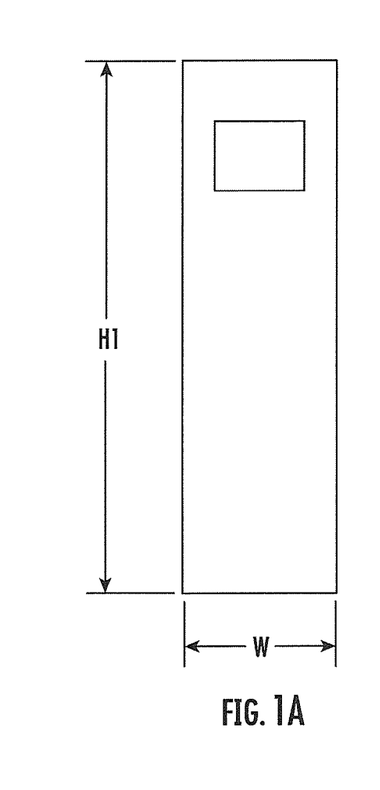
FIG. 1A is a diagram of a frontview of the gas insulated switchgear (GIS) enclosure in accordance with various embodiments of the present inventive concept.

Referring first to FIG. 1A, a diagram of a front view of an example switchgear 100 in accordance with some embodiments of the present inventive concept will be discussed. As illustrated in FIG. 1A, the housing for the GIS may have a height H1 and a width W. In some embodiments, the height H1 may be about 82.68 inches (2100 mm) from the ground and the width W may be about 23.62 inches (600 mm). It will be understood that these dimensions are provided as examples only and embodiments of the present inventive concept are not limited to this configuration.

Figure 1B:
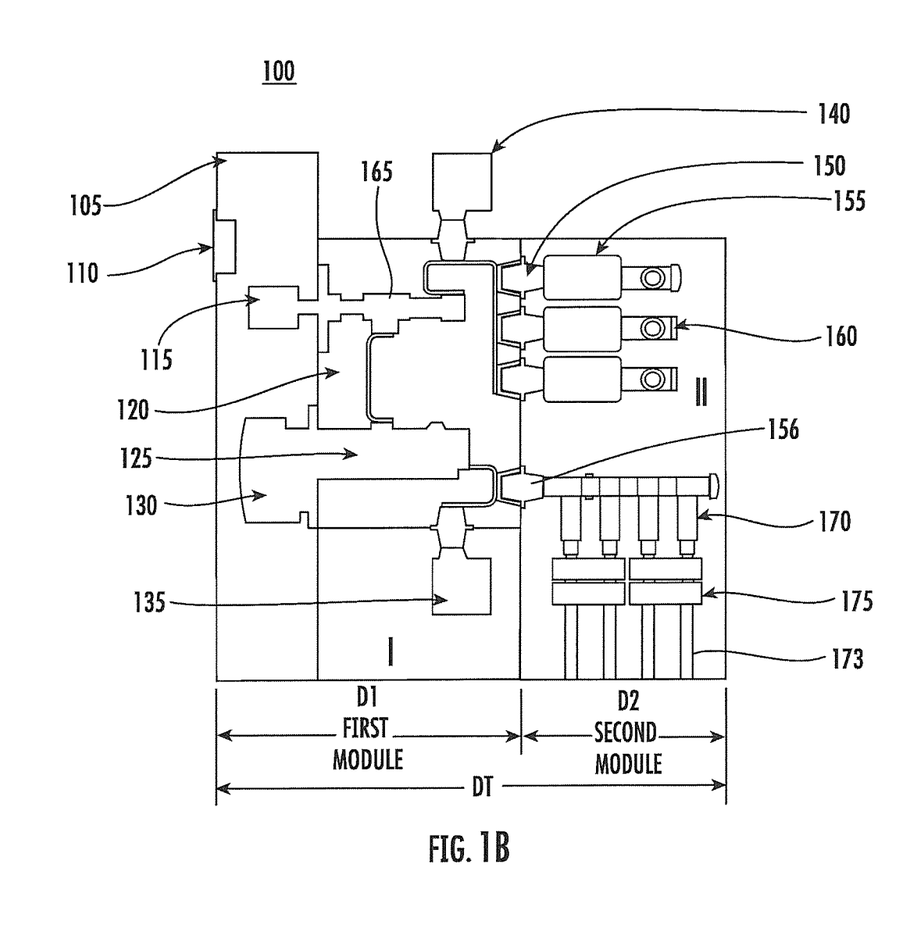
FIG. 1B is a diagram illustrating a sideview of a modular GIS system in accordance with some embodiments of the present inventive concept.

As illustrated in the sideview of the GIS 100 in FIG. 1B, the GIS has a total depth of DT, a first module (I) having a first depth D1 and a second module (II) having a second depth D2 and a second height H2. In some embodiments, the first module I may be a removable module and the second module II may be a stationary module, however, embodiments of the present inventive concept are not limited to this configuration. For example, in some embodiments the first module I may be stationary and the second module II may be removable without departing from the scope of the present inventive concept. Furthermore, the two modules may be broken into more modules without departing from the scope of the present inventive concept as will be discussed further with respect to FIG. 3. In some embodiments, the first module I may have a first depth D1 of 47.24 inches (1200 mm), the second module II may have a second depth D2 of 31.50 inches (800 mm) and a total depth DT of the GIS (when assembled) of 78.74 inches (2000 mm). The second module II may have a second height H2 of 68.90 inches (1750 mm). The dimensions are provided herein for example only and are not intended to limit dimensions in accordance with embodiments discussed herein.

As further illustrated in FIG. 1B, the GIS 100 may be divided into two modules I and II. As discussed above, the modular GIS discussed herein may be provided in two or more modules without departing from the scope of the present inventive concept. For example, each of the various functions may be provided in their own module housing. These modules may include, but are not limited to a cabling module, a low-voltage module, a main bus module, a mechanism module, current transformer (CT)/voltage transformer (VT) modules and the like.

In embodiments illustrated in FIG. 1B, a modular GIS 100 in accordance with some embodiments of the present inventive concept includes first I and second modules II. The first module I includes a low-voltage compartment 105, a control unit 110, a three-position disconnector operating mechanism 115, an insulating gas in a gas tank 120, a circuit breaker 125, a three-position disconnector operating mechanism 165, a circuit breaker operating mechanism 130 and plug-in type VTs 135 and 140. The second module II includes bus bar connectors 150, a ring type CTs 155 and 175, a bus connector 160, and a cable connector 170 and the incoming and outgoing cables 173. In some embodiments, the bus connector 160 and the cable connector 170 may be provided by a solid shielded insulating system (SSIS) separable style connector without departing from the scope of the present inventive concept. Furthermore, the bus bar connectors 150 and connector 156 may be male or female without departing from the scope of the present inventive concept.

As illustrated in FIG. 1B, the first module I is coupled to the second module II using connectors 150 and connector 156. As illustrated, these connectors 150 and 156 are configured so that the first module and the second module "plug in" to each other. In other words, the first and second modules I and II, respectively, can be connected and/or disconnected relatively easy without tools, wires, screws and the like. In some embodiments, the first I and second II modules may be connected and/or disconnected using connectors and systems discussed in commonly assigned U.S. Pat. No. 10,164,412, issued on Dec. 25, 2018, the disclosure of which is hereby incorporated herein by reference as if set forth in its entirety. These connectors are illustrated, for example, in FIG. 4. However, it will be understood that embodiments of the present inventive concept are not limited thereto.

Figure 4:
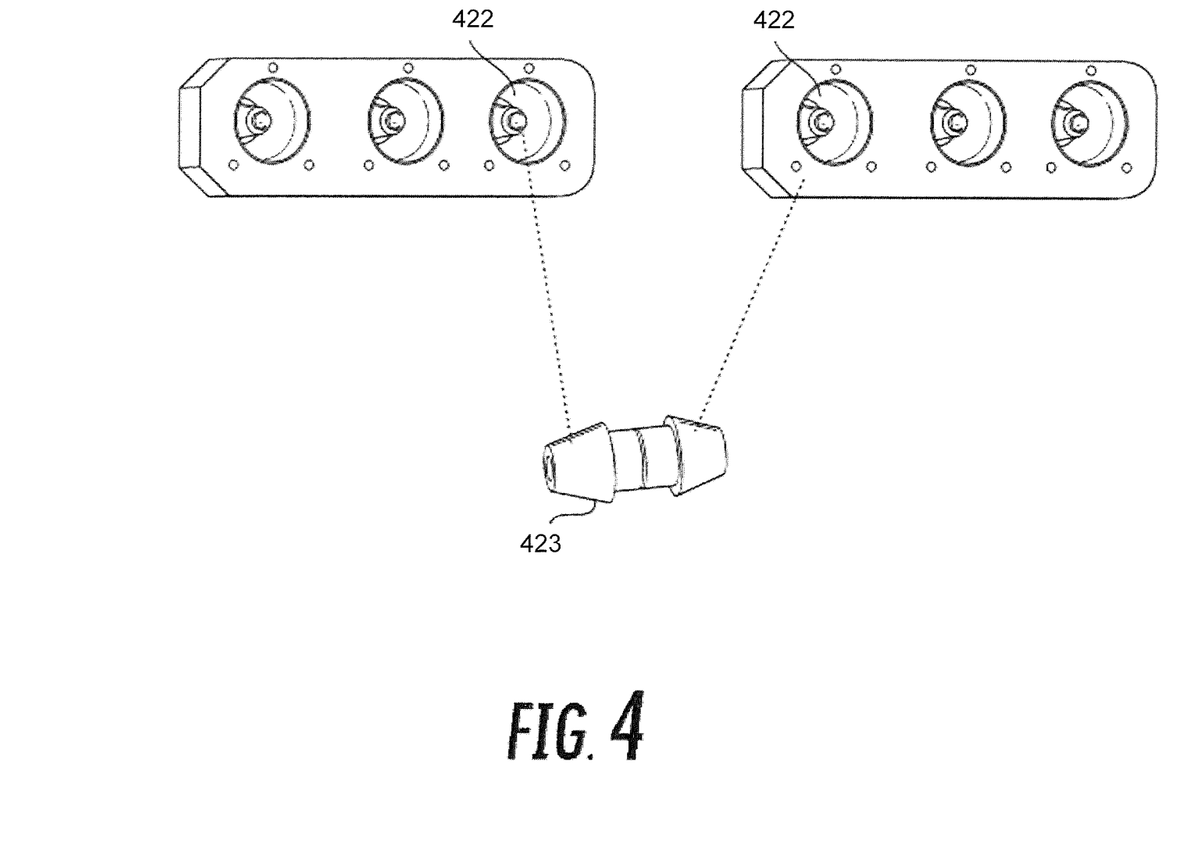
FIG. 4 is a diagram illustrating connectors for use in accordance with some embodiments of the present inventive concept.

As illustrated in FIG. 4, connectors 422 for use in accordance with embodiments discussed herein may be conical-profile receptacles that can be interconnected using cable plugs 423 that are configured to be inserted into each of the connectors 422 to provide an electrical interconnection. Examples of such connectors and cable plugs include, for example, those used in the FUNK bus bar coupling system distributed by Pfisterer Holding AG and described at catalogue.pfisterer.com/en/connections-6-52-kv/other-connectors/busbar-coupling-system-flink/The connectors 422 or similar connector arrangements may be used for interconnection of the modules as discussed herein in accordance with some embodiments of the present inventive concept.

It will be understood that the components of the GIS 100 of FIG. 1B are provided for example only. Many of these mechanisms, devices and connectors may be replaced by equivalent items without departing from the scope of the present inventive concept. The gas tank 120 may be, for example, a 1250 A circuit breaker gas tank, a 2500 A circuit breaker gas tank, or a 1250 A bus sectionalizer gas tank, or a 2500A bus sectionalizer gas tank without departing from the scope of the present inventive concept. The gas may be, for example, sulfur hexafluoride ($SF_6$), but is not limited thereto. Similarly, the VTs may be, for example, a fused VT or a non-fused VT. VTs may be located at a top portion of the GIS, a bottom portion of the GIS or in a remote location without departing from the scope of the present inventive concept. In some embodiments, the VTs may be 36 kV class VTs with a frequency of 50-60 Hz. Finally, the CTs may be, for example, single phase, ring-type CTs. The CTs utilized will meet applicable IEC, IEEE, GB and/or NEMA standards.

Figure 2:
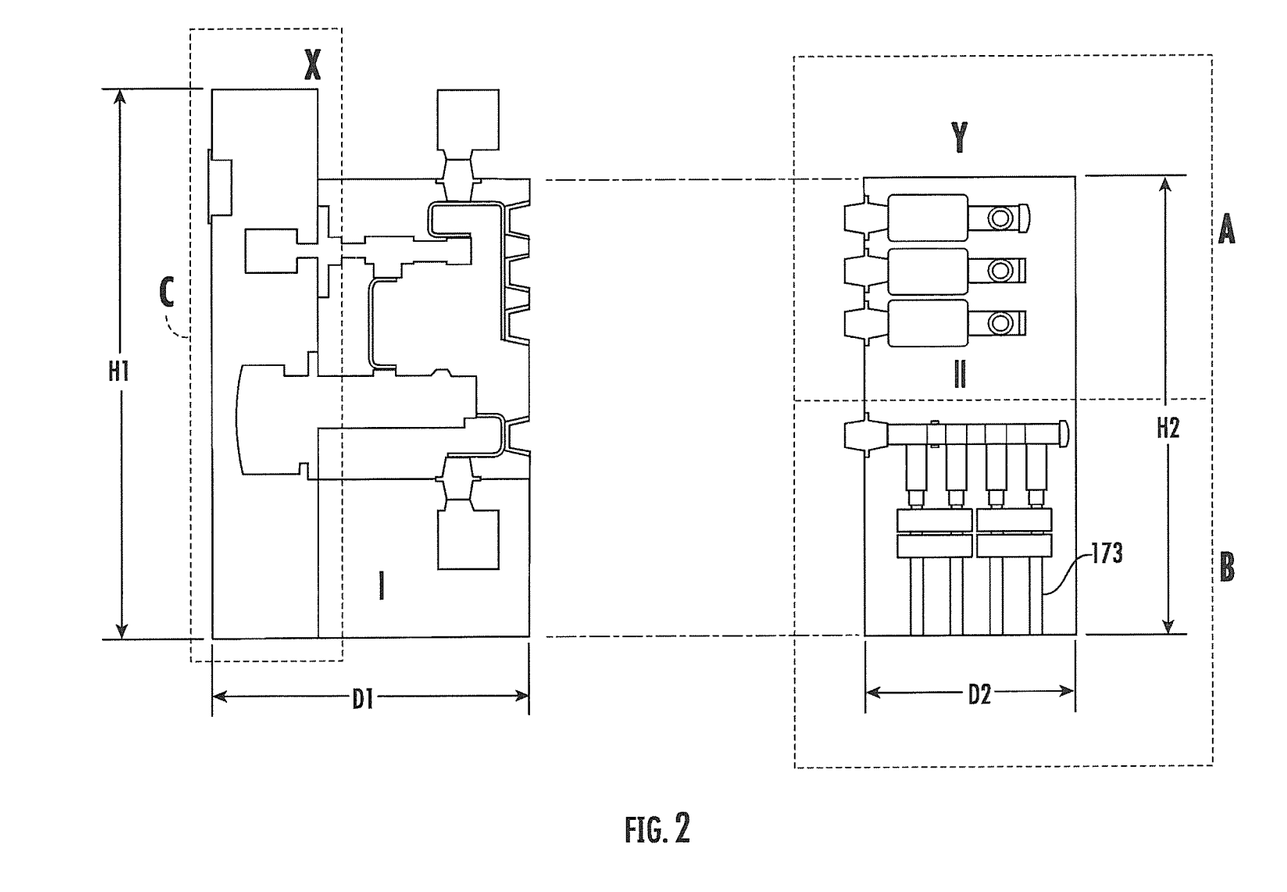
FIG. 2 is a diagram illustrating two separate modules of the modular system in accordance with some embodiments of the present inventive concept.
Figure 5:
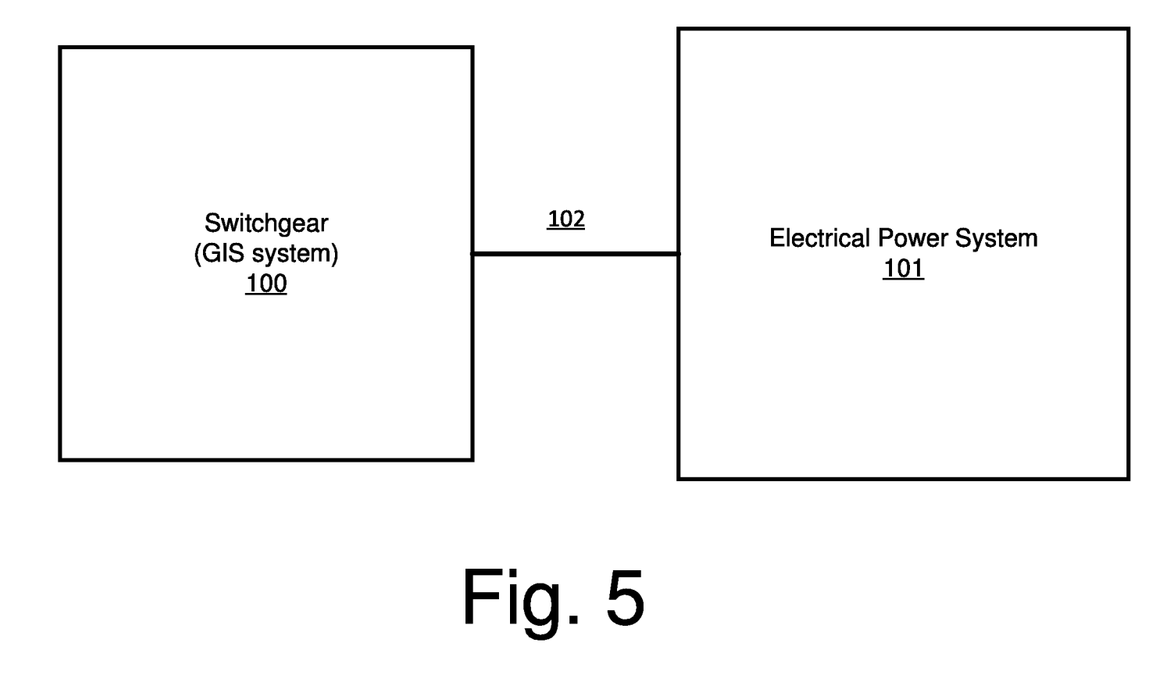
FIG. 5 is a diagram illustrating a system including a GIS system and electrical power system in accordance with some embodiments of the present inventive concept.

As illustrated in FIG. 2, the first and second modules I and II, respectively, are configured to fit together and can be assembled by the modules, much like building blocks or legos. In embodiments of the present inventive concept illustrated in FIG. 2, the second module II is stationary and the first module I is removable. As further illustrated in FIG. 2, the second module II includes much of the cabling 102 (FIG. 5) (FIG. 1B) 173 required to connect the GIS to the electric power system 101 (FIG. 5). Thus, the second module II can be manufactured/shipped first and then installed at the customer location, while the first module I is still being manufactured/assembled at the factory. The ability to provide the GIS in modules as discussed herein may allow customers to meet critical deadlines during manufacture. Furthermore, when a portion of the GIS needs repair, modular systems allow only the damaged portions of the GIS to be replaced, which saves cost for the customer.

As discussed above, although embodiments of the present inventive concept are illustrated as having two modules, embodiments discussed herein are not limited thereto. For example, as shown in FIG. 2, the second module II can be broken into two modules A and B. Module A may include at least the cabling 173 and module B may include the remaining portions of module II. Furthermore, in some embodiments, a third module C may be removeable without departing from the scope of the present inventive concept. Example embodiments illustrating splitting the GIS 100 into more than two modules will be discussed further below with respect to FIG. 3.

Figure 3:
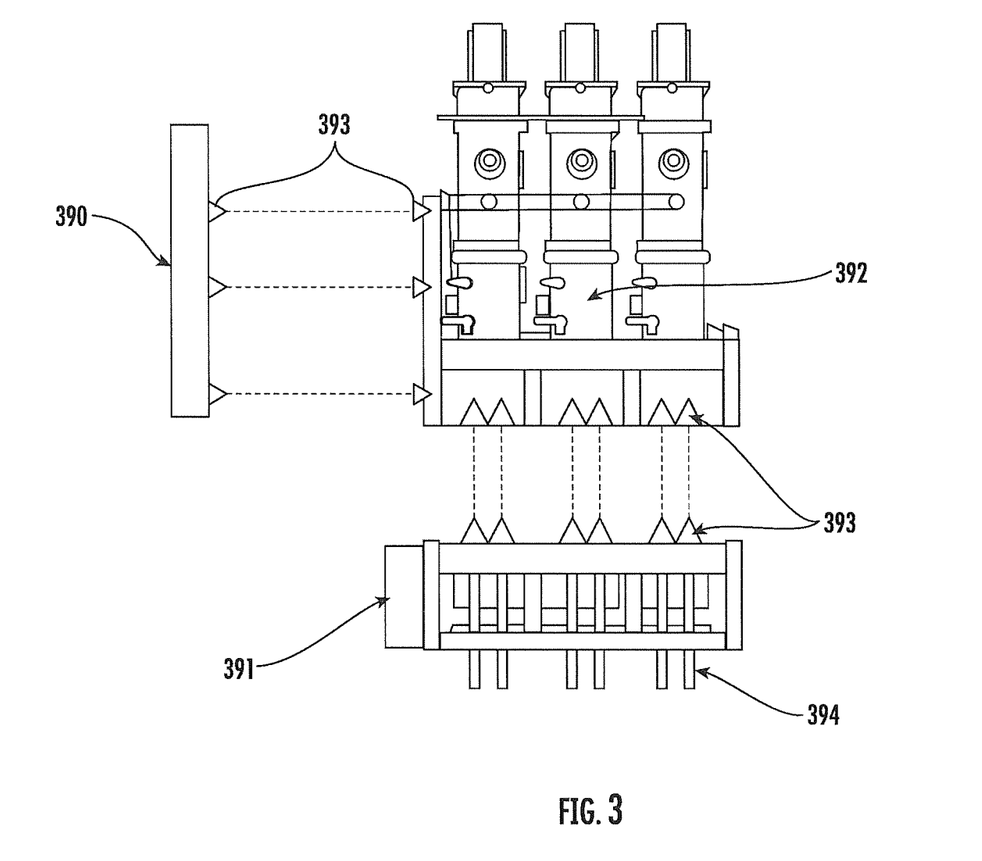
FIG. 3 is a diagram illustrating various modules of the modular system in accordance with some embodiments of the present inventive concept.

Referring now to FIG. 3, GIS systems including various module in accordance with embodiments of the present inventive concept will be discussed. Systems discussed above are illustrated as having front and back modules, either one of which (or both) may be removable. Embodiments illustrated in FIG. 3 show top and bottom modules. As illustrated therein, the GIS system illustrated in FIG. 3 includes an iso-phase switchgear pole unit module 392, a medium voltage cable connection module 391 to which incoming and outgoing power cables 394 are connected, and a low voltage control device and mechanism module 390. As discussed above, embodiments of the present inventive concept are not limited to the embodiments illustrated in FIG. 3, more or fewer modules may be included without departing from the scope of the present inventive concept. Furthermore, one or more of the modules in FIG. 3 may be stationary.

Referring again to FIG. 3, as shown, the iso-phase switchgear pole unit module 392 includes pole units preassembled into a common frame that connects to the incoming/outgoing power cables 394 through the medium voltage cable connection module 391 using, for example, bolt-less connection cones with alignment features 393. Similarly, the mechanism module 390 may be connected to the iso-phase switchgear pole unit module 392 using bolt-less connection cones 393 as illustrated in FIG. 3. The bolt-less connection cones allow relatively easy installation and removal of the various modules without requiring wire connections, access to the rear of the system or panel removal. It will be further understood that the modules of the system illustrated in FIG. 3 can be removed/installed without removing gas from all compartments.

In embodiments illustrated in FIG. 3, both the mechanism module 390 and the iso-phase switchgear module 392 are shown as "plugging in" to other modules using the boltless connections cones 393. In these embodiments, the medium voltage cable connection module 391 may be stationary and modules 390 and 392 may be removeable. However, it will be understood that embodiments of the present inventive concept are not limited to this configuration. For example, module 391 may be separated into two modules in some embodiments.

As briefly discussed above, some embodiments of the present inventive concept provide a GIS system in separate and distinct modules allowing these modules to be shipped to a destination separately. Thus, a cabling module may be shipped ahead of the other modules and connected to the electric power system before the remaining modules have been completed. Thus, when the remaining modules are completed, they can simply be connected to the cabling module and time lines for completion may be met. It will be understood that the cabling module does not have to be shipped first, any module may be shipped at any time. However, due to the complexity and time involved in connecting the cables to the existing electric power system, when time is an issue, this module should be shipped earlier in the process.

In the drawings and specification, there have been disclosed exemplary embodiments of the inventive concept. However, many variations and modifications can be made to these embodiments without substantially departing from the principles of the present inventive concept. Accordingly, although specific terms are used, they are used in a generic and descriptive sense only and not for purposes of limitation, the scope of the inventive concept being defined by the following claims.

What is claimed is:

1. A gas insulated switchgear (GIS) system, the system comprising:
a plurality of separate modules assembled to form the GIS system, the plurality of separate modules, when disassembled, being independent of one another and configured to form the GIS system at a destination, wherein one or more of the plurality of separate modules comprises a cabling module including one of cabling and a solid insulating bus bar to connect the GIS system to an electrical power system at the destination.

2. The GIS system of claim 1, wherein the one or more of the plurality of separate modules is shipped prior to shipment of remaining modules of the plurality of separate modules such that the cabling module is connected to the electrical power system at the destination in advance of connecting the remaining modules.

3. The GIS system of claim 1, wherein any one of the plurality of separate modules is configured to be replaced in the GIS system without replacement of remaining ones of the plurality of separate modules.

4. The GIS system of claim 1, wherein the plurality of separate modules comprise a low-voltage unit, a main bus unit, a mechanism unit, a circuit breaker unit, a disconnect unit, a current transformer unit, a voltage transformer unit and/or a cabling unit.

5. The GIS system of claim 4, wherein each of the low-voltage unit, the main bus unit, the mechanism unit, the circuit breaker unit, the disconnect unit, the current transformer unit, the voltage transformer unit and/or the cabling unit each comprise a dedicated separate module in the GIS system.

6. The GIS system of claim 1, wherein the plurality of separate modules comprise a low-voltage compartment, a control unit, a three-position disconnector operating mechanism, an insulating gas in a gas tank, a circuit breaker, a circuit breaker operating mechanism, voltage transformers (VTs), bus bar connectors, current transformers (CTs), a bus connector, a three-position disconnector operating mechanism and a cable connector.

7. The GIS system of claim 1, wherein the plurality of modules are connected and disconnected without removing gas from the system.

8. The GIS system of claim 1, wherein the plurality of modules are connected using bolt-less connecting cones with alignment features such that the plurality of modules are connected and disconnected without cables.

9. The GIS system of claim 1, wherein the plurality of modules are connected and disconnected without rear access.

10. The GIS System of claim 1, wherein the plurality of modules are connected and disconnected without removing an entire front panel.

11. A cabling module for use in a modular gas insulated switchgear (GIS) system, the cabling module comprising one of cabling and a solid insulated bus bar to connect the GIS system to an electrical power system at a destination,
wherein the modular GIS system comprises a plurality of separate modules assembled to form the GIS system, the plurality of separate modules, when disassembled, being independent of one another and configured to form the GIS system at the destination, wherein one or more of the plurality of separate modules includes the cabling module.

12. The cabling module of claim 11, wherein one or more of the plurality of separate modules is shipped prior to shipment of remaining modules of the plurality of separate modules such that the cabling module is connected to the electrical power system at the destination in advance of connecting the remaining modules.

13. The cabling module of claim 11, wherein any one of the plurality of separate modules is configured to be replaced in the GIS system without replacement of remaining ones of the plurality of separate modules.

14. The cabling module of claim 11, wherein the plurality of modules comprise a low-voltage unit, a main bus unit, a mechanism unit, a circuit breaker unit, a disconnect unit, a current transformer unit, a voltage transformer unit and a cabling unit.

15. The cabling module of claim 14, wherein each of the low-voltage unit, the main bus unit, the mechanism unit, the circuit breaker unit, the disconnect unit, the current transformer unit, the voltage transformer unit and/or the cabling unit comprise each comprise a dedicated separate module in the GIS system.

16. The cabling module of claim 11, wherein the plurality of separate modules comprise a low-voltage compartment, a control unit, a three-position disconnector operating mechanism, an insulating gas in a gas tank, a circuit breaker, a circuit breaker operating mechanism, voltage transformers (VTs), bus bar connectors, current transformers (CTs), a bus connector, a three-position disconnector operating mechanism and a cable connector.

17. The cabling module of claim 11, wherein the plurality of modules are connected and disconnected without removing gas from the system.

18. The cabling module of claim 11, wherein the plurality of modules are connected using bolt-less connecting cones with alignment features such that the plurality of modules are connected and disconnected without cables.

19. The cabling module of claim 11, wherein the plurality of modules are connected and disconnected without rear access.

20. The cabling module of claim 11, wherein the plurality of modules are connected and disconnected without removing an entire front panel.

* * * * *

UNITED STATES PATENT AND TRADEMARK OFFICE
CERTIFICATE OF CORRECTION

PATENT NO. : 11,108,215 B2
APPLICATION NO. : 16/260258
DATED : August 31, 2021
INVENTOR(S) : Culhane et al.

Page 1 of 1

It is certified that error appears in the above-identified patent and that said Letters Patent is hereby corrected as shown below:

On the Title Page

Page 2, Column 1, (56) References Cited: Please correct "2011/0299228 12/2011 Milovac" to read -- 2011/0299228 12/2011 Milovac et al. --

Page 2, Column 2, (56) References Cited: Please correct "2018/0090913 A1 03-2018 Johnson to read -- 2018/0090913 A1 03-2018 Johnson et al. --

In the Claims

Column 8, Claim 15, Line 38: Please correct "FUNK bus bar" to read -- FLINK bus bar --

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*